(12) United States Patent
Ricketts

(10) Patent No.: US 7,749,055 B2
(45) Date of Patent: Jul. 6, 2010

(54) DUAL ACTION CORN COB SEPARATION AND CORN COB SEPARATOR

(75) Inventor: Jonathan E. Ricketts, Ephrata, PA (US)

(73) Assignee: CNH America LLC, New Holland, PA (US)

(*) Notice: Subject to any disclaimer, the term of this patent is extended or adjusted under 35 U.S.C. 154(b) by 105 days.

(21) Appl. No.: 12/148,725

(22) Filed: Apr. 22, 2008

(65) Prior Publication Data

US 2009/0264169 A1 Oct. 22, 2009

(51) Int. Cl.
A01F 12/24 (2006.01)

(52) U.S. Cl. ....................... 460/108; 460/107

(58) Field of Classification Search ............... 460/71, 460/107–110
See application file for complete search history.

(56) References Cited

U.S. PATENT DOCUMENTS

| 952,795 | A | | 3/1910 | Flynn |
|---|---|---|---|---|
| 1,482,516 | A | * | 2/1924 | Emil ............................ 460/46 |
| 2,247,557 | A | | 7/1941 | Medley |
| 2,305,964 | A | * | 12/1942 | Harrison et al. ............. 460/109 |
| 2,577,329 | A | | 12/1951 | Irvine |
| 2,771,077 | A | * | 11/1956 | Karlsson et al. ............. 460/108 |
| 2,804,077 | A | | 8/1957 | Anderson |
| 2,833,288 | A | * | 5/1958 | Scranton ...................... 460/108 |
| 3,568,682 | A | * | 3/1971 | Knapp et al. ................. 460/108 |
| 3,716,060 | A | | 2/1973 | Suzue |
| 4,600,019 | A | | 7/1986 | McBroom |
| 4,805,643 | A | | 2/1989 | Tetaka |
| 4,892,505 | A | | 1/1990 | Shrawder |
| 5,041,059 | A | | 8/1991 | Ricketts et al. |
| 5,256,106 | A | | 10/1993 | Shrawder |
| 5,489,239 | A | * | 2/1996 | Matousek et al. ............. 460/62 |
| 5,941,768 | A | | 8/1999 | Flamme |
| 6,358,141 | B1 | | 3/2002 | Stukenholtz et al. |
| 6,485,364 | B1 | * | 11/2002 | Gryspeerdt et al. ......... 460/107 |
| 6,537,148 | B2 | | 3/2003 | Schwersmann |
| 7,163,457 | B2 | | 1/2007 | Esken et al. |

FOREIGN PATENT DOCUMENTS

JP 200457117 2/2004

* cited by examiner

Primary Examiner—Thomas B Will
Assistant Examiner—Mai T Nguyen
(74) Attorney, Agent, or Firm—Michael G. Harms; John William Stader; Patrick M. Sheldrake

(57) ABSTRACT

A dual action corn cob separation and attendant corn cob separator, having a plurality of generally vertical or generally longitudinally elongated slots, and having disposed therebetween at least two of said slots, at least one generally vertical or longitudinal in-line row of smaller slots or openings, whereby whole corn cobs can be more effectively harvested.

8 Claims, 4 Drawing Sheets

DUAL ACTION CORN COB SEPARATION AND CORN COB SEPARATOR

TECHNICAL FIELD

This invention relates to the threshing and separation of corn from corn cobs, and particularly the separation of corn cobs from MOGC (material other than grain or cobs). The MOGC is comprised of, for example, stalk portions, leaves, husks, tassels or silks, and other debris of generally lighter density than the cobs. This invention even more particularly relates to improvements for grate sections employed on combine harvesters, to separate corn cobs from other residue.

BACKGROUND ART

Corn cobs have, for many years, added a certain measure of value to the harvest. Prior to the early 60's, the common corn harvesting practice was to pick the ears in the field, transport the crop to corn cribs, and later shell the corn off the cob at stationary shellers. The need to dispose of the cobs, after shelling, spurred most of the early research for useful cob end products. However, using stationary shellers limited the volume of cobs which had to be dealt with.

The advent of in-field shelling, by self-propelled combine harvesters created extreme efficiencies. The combine harvesters were designed to recover only shelled corn, or shelled corn incorporating only small amounts of cob, while crushing and discharging most of the cob back onto the ground. Early attempts to recover the cobs included adjusting the fingered vanes, on the harvester's chaffer, in order to open them wider and thus allow larger amounts of broken cob to fall through. However, this caused pieces of cob to lodge in the fingers and plug the chaffer. Accordingly, the vanes were lowered back to prevent plugging. Thus, only reduced volumes of cob residuals could be obtained for corn-and-cob-mix products.

In the late 70's and early 80's, it was found that a variety of high-moisture earcorn yielded even higher feed value for dairy and growing feed cattle than shelled corn itself. Certain feeds therefore included ground up cobs with kernels as a source of roughage. Corn cobs were also introduced into biomass procedures. In these instances, no attempt was made during threshing, or during other phases of combine operations, to preserve the cob in a useful shape.

Not long afterwards, cobs, which were fractured into segments having defined lengths of less than 3 inches, were found to have considerable use. The chunks were employed as a growth medium in mushroom cultures, as ornamental mulch, as non-harmful industrial abrasives and absorbents, as lightweight aggregates in the construction industry, as degreasers, as water separators in alcohol production, and as clean burning non-sulfur fuel. Also, cob segments were produced as sources for chemicals such as the amino acids choline, and for oxalic acid and for xylitol, among others. In certain areas, cob segments were collected to extract the chemical solvent furfural.

In 1986, Chester McBroom was granted a patent on the Corn Cob Saver Sieve (U.S. Pat. No. 4,600,019). McBroom discovered an attachment, for combine harvesters, which enabled harvesting high-moisture earcorn type feed, etc. which incorporated higher percentages of cob. However, one drawback was the cobs could not be directly retrieved from the combine harvester.

Retrieval of cobs directly and automatically from the combine was nevertheless undertaken by Larry Shrawder beginning in 1989 (U.S. Pat. No. 4,892,505) and then in 1993 (U.S. Pat. No. 5,256,106). Therein, combine harvest separator arcs were modified to a circular shape, from elliptical; and, the cross bar spacing was altered on sieve slots; and a cob conveyor was added. But, his process and the special features of his combine design allowed harvesting only cobs having lengths which, as previously discussed, did not exceed 2-3 inches.

In 1999, Vernon L. Flame, in U.S. Pat. No. 5,941,768 entitled Corn Cob Collecting Apparatus For Use With Combines, dealt with the problem of harvesting dry corn cobs. He found that the cobs could not be separated from the stalks, husks, etc. through the use of air. Blowing air across the mix was too inefficient to separate cobs from MOGC. His solution was to use a wheeled apparatus connected to the rearward end of the combine in order to achieve separating the cobs.

In 2002, U.S. Pat. No. 6,358,141 by Stukenholtz disclosed an on-board system for separating whole corn cobs by modification to the sieve and straw walker system. However, the system does not provide the efficiency in separation needed to produce corn cobs at commercial demand levels.

In recent years, as the demand and utilization of fossil fuels has skyrocketed, likewise has the demand for corn cobs as alternative renewable energy sources and as feedstock for environmentally friendly biodegradable packaging. Enormous volumes of corn cobs are needed as a principal feed stock for ethanol fuels. One company plans on harvesting cobs from plots having a minimum of 4000 acres as a component of their system that will eventually handle harvesting as much as 275,000 acres of cobs by as early as 2011. The cobs will be used, inter alia, by public utility companies as biomass to co-fire with coal, because the cob's burn value is competitive with that of wood.

For projects of this size and volume, cobs will be stored outside. Since broken cobs would more readily mold, and decay than whole cobs, the goal currently is to harvest the cobs as whole, or in lengths as long as possible. The industry therefore needs no cobs less than 3 inches, and as many whole cobs as possible. If the cobs were broken up, they would require storage in a dry environment, and much greater cost.

A threshing and separating system for combine harvester that would significantly enhance the recovery and harvesting of corn cobs, particularly whole unbroken cobs, would constitute a welcomed but surprising advancement in the art.

SUMMARY OF THE INVENTION

The combines of the invention are axial flow combines which use one or more horizontally arranged rotors which are rotated in associated chambers, and which chambers are partly constituted by threshing and separating concaves and grates. The crop material is subjected to a much longer threshing and separation cycle than in conventional combines and therefore, the efficiency of axial flow machines is greater. A higher degree of separation is reached and the grain losses are reduced.

The concaves are provided at the front end of the rotor and grates at the rearward end, all above a cleaning system and constitute the lower portion of the chamber. The top portion of the chamber comprises a curved cover which has, at its inner surface, a set of fins or vanes to guide the crop rearwardly along a spiral path to the end of the threshing and separating zone.

In the method of the invention, the crop material mat revolves around the rotor continually, while separating first the kernels, through concaves on the front portion of the rotor, and second, separating the whole cobs, through grates, from the straw or material other than cobs and grain, occurring later at the rearward end of the rotor.

In accordance with the invention, the conventional separating grates of the combine harvester are replaced by cob separation grates having a plurality of substantially parallel and substantially vertically or longitudinally disposed and latitudinally spaced apart slots. The slots are oriented lengthwise in the direction of rotation of the rotor and may be vertical or slanted down by up to 40° from vertical and are wide enough to accommodate corn cobs falling vertically from the rear of the rotor cage through the grate section. Each slot is an elongated opening that extends the substantial height of the grate. The grates are arcuate rectangles which surround the lower half of the rotor at its rear end and are essentially parallel to one another. Two or more of the elongated cob slots are separated by a row of in-line smaller openings or slots therebetween which are too small for the majority of the MOG (material other than grain) and cannot accommodate cobs. Additionally, there is a row of perimeter or peripheral smaller openings at each of the two ends, left and right side, of the grate.

By allowing the threshed cobs to fall from the rotor area to the cleaning area of the combine, the cobs (having corn kernels removed) together with the corn kernels can be harvested, in a unique dual action, in tandem with the threshing and separation of corn which occurs at the front end of the combine. The cleaning area has a special sieve to remove the leaf debris allowing the cobs along with the grain to be transported to the holding bins.

DETAILED DESCRIPTION OF THE INVENTION

Figure 1:
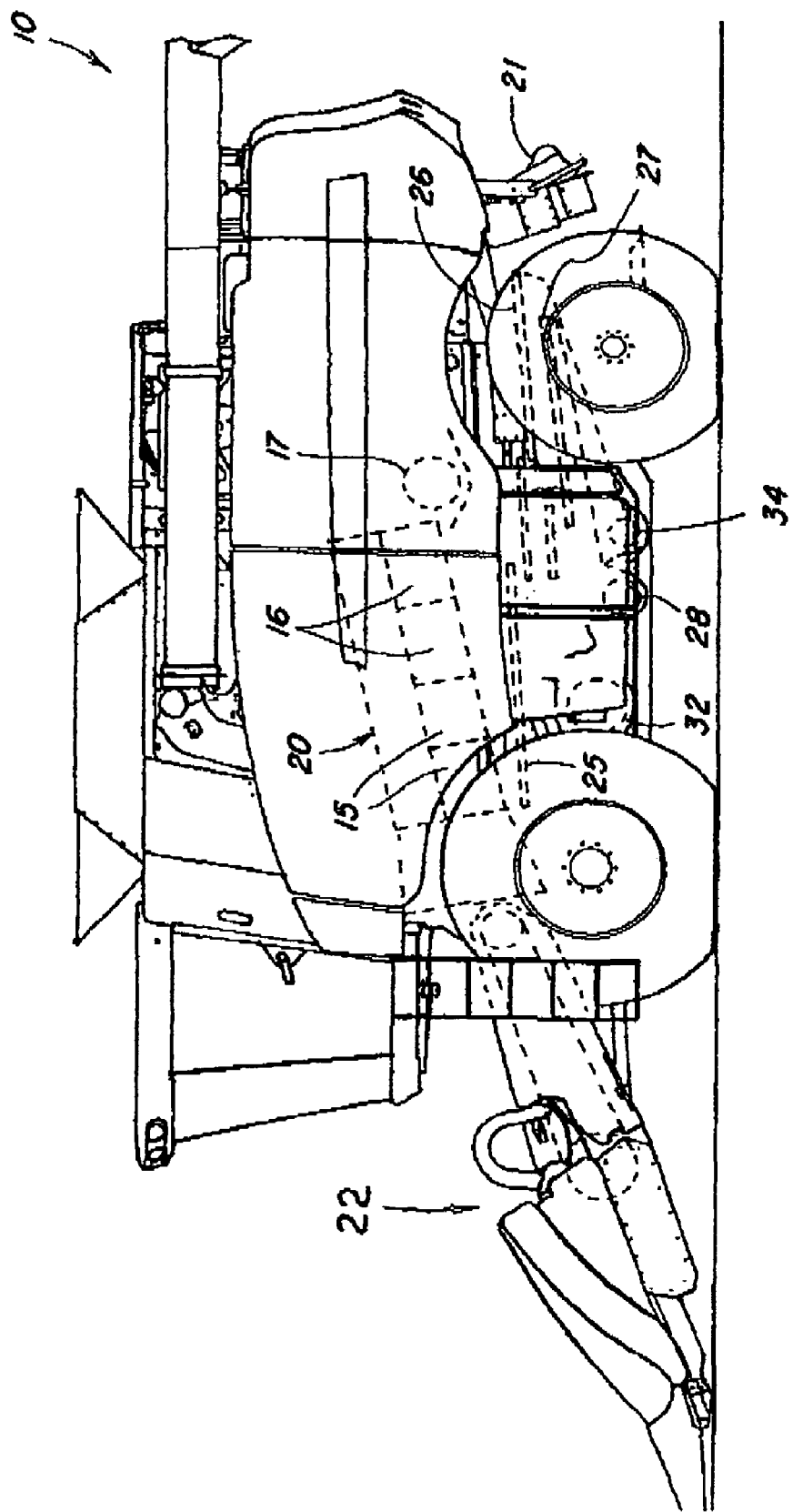
FIG. 1 is a side elevation of a combine harvester having axial flow threshing and separating units.
Figure 2:
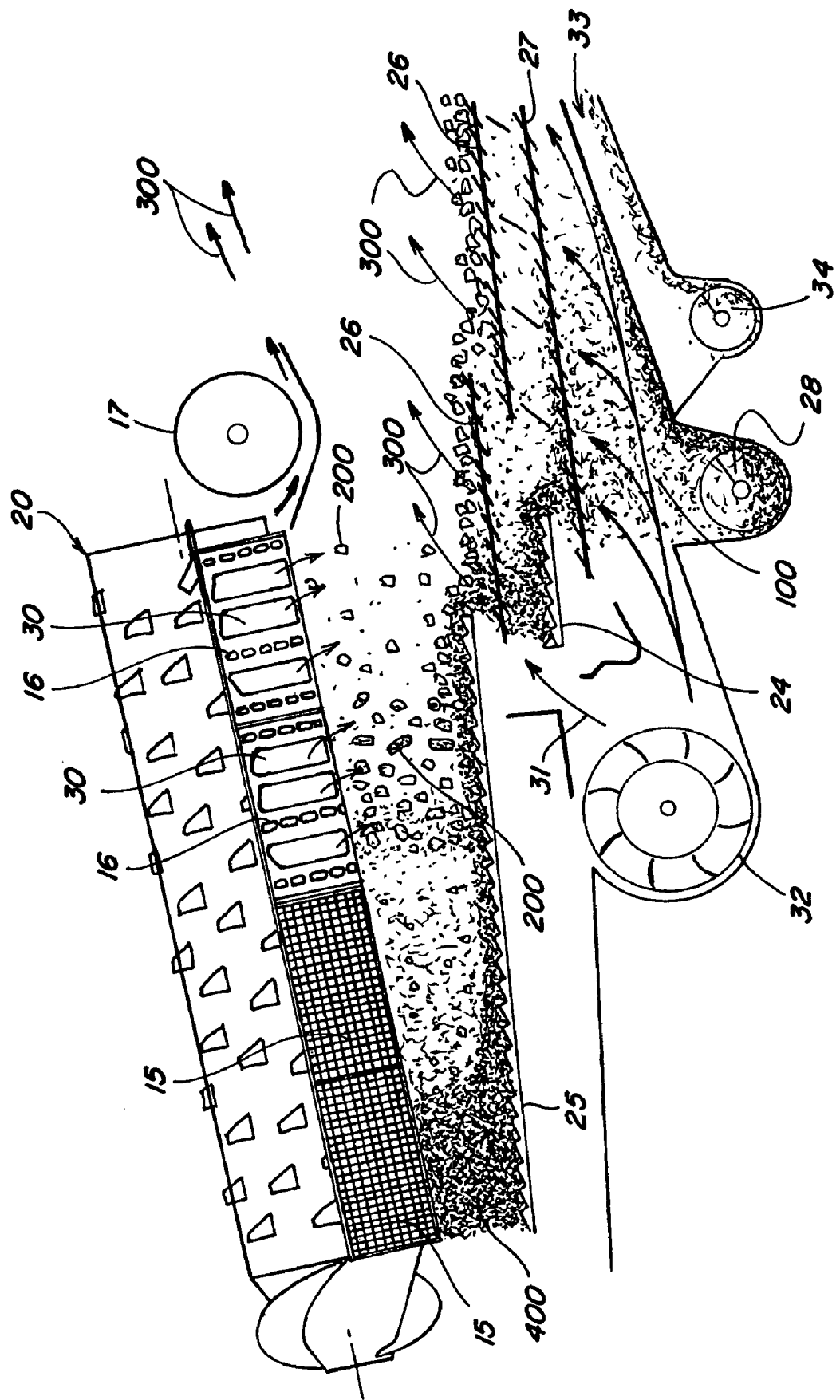
FIG. 2 is a side elevation of the dual action corn and cob separation in a combine harvester of the present invention.
Figure 3:
FIG. 3 is a side elevation of corn cobs falling from the corn cob separator of the present invention and onto the cleaning system of the combine.

Since the non-essential aspects of the combine harvester 10 are well known to those skilled in the art, only those aspects of the combine that are most pertinent to the present invention will be discussed in detail. Referring now to FIGS. 1 and 2, the rotor assembly 20 receives earcorn collected from the field through the header 22 mounted to the front of the combine 10. The earcorn is threshed and separated at the rotor assembly 20 causing the corn 100 to separate from the cobs 200 and the MOGC (material other than grain or cobs) 300. The corn kernels and limited amounts of MOG (material other than grain) 400 are separated from the cobs and, if small enough, fall through the openings of the concaves 15 at the front end of the rotor assembly 20 during a frontal separation stage. Meanwhile, cobs 200 fall in a form substantially whole through corn cob slots 30 which are disposed in grates 16 during a subsequent back end separation stage, which together with the frontal stage, establish the dual action separation. The unique design of the grates 16 surprisingly permit the predominant portions of MOGC 300 to be blown by air directly into beater assembly 17 and then rearward to the spreader unit 21 at the rear of the combine harvester 10. Corn kernels 100 are sifted through the cleaning system from the grain pan 25 through the chaffers 26 and the sieve 27, to ultimately collect as clean corn in the clean grain auger 28 and moves toward a holding bin. Cobs 200 fall onto the chaffer where they are moved to separate holding bins, while air 31 from fan 32 blows MOGC 300 which is of lighter density than cobs 200 or grain 100 up through the back of the combine 10 and into the spreader 21. Residue 33 which falls from the back of the cleaning sieve 27 in chaffer 26 fall on down towards the return auger 34.

Figure 4:
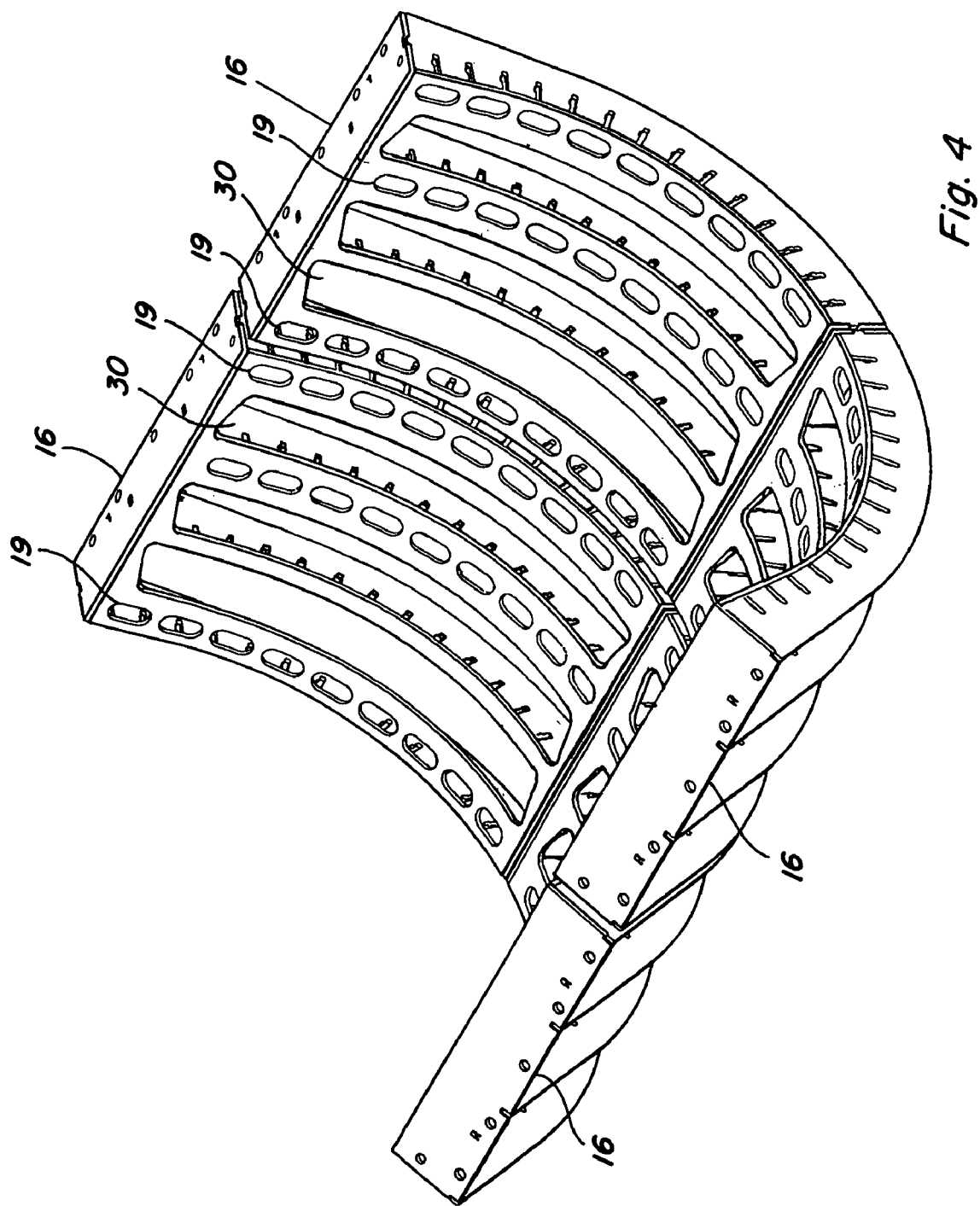
FIG. 4 is a perspective view of the corn cob grate of the present invention.

Referring now to FIG. 4, the corn cob grate 16 is arcuate in shape and fits to the rear end of the rotor assembly. The grate 16 has a plurality of slots 30 through which cobs can fit. The slots may range in width from ½ inch to as large as 2¼ inches, but preferably are about 1.25 inches in width. The slots are preferably substantially vertical or longitudinally disposed so as to be essentially vertical and are oriented in the direction in which the rotor is rotating. The slots may also be oriented down by an angle of up to about 40° from vertical. Slots 30 run the essentially the entire height of the grates 16. There are actually 4 separate grates 16 illustrated in FIG. 4 which come together collectively as one arcuate form to be attached underneath the rotor assembly 20. There are two or more slots 30 for each grate 16, two of which slots 30 are separated by a latitudinally disposed in-line row of smaller holes or slots 19. Each grate has a row of the in-line smaller holes 19 that are peripherally in line with the direction of rotation of the rotor assembly 20. The peripheral row of smaller slots 19 along the edges of each grate 16 allow smaller MOG and some corn kernels that have made it through from the front rotor's separation stage to pass through the grates 16.

The additional alternative embodiment calling for at least one of slots 30 on the grate 16 to be oriented at an angle of up to 40° from vertical and in the direction of material flow, i.e. the direction in which the rotor's movement or rotation transports the material may be advantageous in some applications. A particular row of in-line smaller openings or slots 19 may optionally be oriented in a direction substantially parallel to direction of the slots 30 closest to the said in-line row.

In light of all the foregoing, it should thus be apparent to those skilled in the art that there has been shown and described a novel combine harvester and separation process. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An improved cob separation grate section having an arcuate shape for an axial flow combine harvester to separate corn cobs from the stalks and leaves, comprising:

a plurality of latitudinally spaced apart elongated slot openings, each slot extending substantially the entire height of the grate, wherein at least one of the elongated slots is oriented at an angle from vertical;

at least one longitudinal row of in-line smaller openings oriented at an angle from vertical and extending substantially the entire height of the grate, wherein the at least one row of in-line smaller openings is oriented substantially parallel to the direction of the at least one of the elongated slots oriented at an angle from vertical and wherein two or more of said slots are separated therebetween by said at least one row; and said grate having a peripheral row of in-line smaller openings located at a forward end and a back end of the grate;

whereby cobs are passable through the slots but not the smaller openings, and whereby the corn grain is passable through the smaller openings but most material other than grain or cobs is not passable.

2. The grate of claim 1 wherein the at least one of the elongated slots oriented at an angle from vertical of up to about 40° in the direction of rotation of the rotor.

3. The grate of claim 1 wherein said slots vary in width from about 0.50" to about 2.25".

4. The grate of claim 2 wherein said slots vary in width from about 0.5" to about 2.25".

5. The grate of claim 1 wherein the slots are 1.25" in width.

6. The grate of claim 2 wherein the slots are about 1.25" in width.

7. An improved method for separating corn cobs from material other than corn cobs, comprising:

providing a dual action separation having corn separated in an initial concave front section of an axial flow combine harvester having a rotor moving corn material in a direction of flow, and having said corn cobs substantially whole being separated from material other than corn or cobs at a rear grate section having a plurality of latitudinally spaced apart elongated slot openings, each slot extending substantially the entire height of the grate, wherein at least one of the elongated slots is oriented at an angle from vertical; at least one longitudinal row of in-line smaller openings oriented at an angle from vertical and extending substantially the entire height of the grate, wherein the at least one row of in-line smaller openings is oriented substantially parallel to the direction of the at least one of the elongated slots oriented at an angle from vertical and wherein two or more of said slots are separated therebetween by said at least one row; and said grate having a peripheral row of in-line smaller openings located at a forward end and a back end of the grate, whereby whole corn cobs are harvested.

8. The method of claim 7 wherein the at least one slot is oriented at an angle of up to about 40° from vertical in the general direction of flow of the corn material.

\* \* \* \* \*